US005311574A

United States Patent [19]
Livanos

[11] Patent Number: 5,311,574
[45] Date of Patent: May 10, 1994

[54] AUTOMATIC CUSTOMER CALL BACK FOR AUTOMATIC CALL DISTRIBUTION SYSTEMS

[75] Inventor: Konstantin Livanos, Naperville, Ill.

[73] Assignee: AT&T Bell Laboratories, Murray Hill, N.J.

[21] Appl. No.: 780,605

[22] Filed: Oct. 23, 1991

[51] Int. Cl.⁵ .................... H04M 1/64; H04M 1/56
[52] U.S. Cl. ........................ 379/88; 379/67; 379/266; 379/209; 379/214; 379/142; 379/127; 379/309
[58] Field of Search ............ 379/67, 88, 89, 265, 379/266, 309, 214, 142, 127, 209

[56] References Cited
U.S. PATENT DOCUMENTS

| | | | |
|---|---|---|---|
| 4,048,452 | 9/1977 | Oehring et al. | 179/27 D |
| 4,328,396 | 5/1982 | Theis | 179/6.04 |
| 4,788,715 | 11/1988 | Lee | 379/84 |
| 4,797,911 | 1/1989 | Szlam et al. | 379/67 |
| 4,800,583 | 1/1989 | Theis | 379/67 |
| 4,899,375 | 2/1990 | Bauer et al. | 379/264 |
| 4,953,204 | 8/1990 | Cuschleg et al. | 379/266 |
| 5,036,535 | 7/1991 | Gechter et al. | 379/210 |
| 5,070,525 | 12/1991 | Szlam et al. | 379/133 |
| 5,155,761 | 10/1992 | Hammond | 379/67 |
| 5,181,236 | 1/1993 | La Vallee et al. | 379/266 |
| 5,185,782 | 2/1993 | Srinivasan | 379/266 |

*Primary Examiner*—James L. Dwyer
*Assistant Examiner*—Fan Tsang
*Attorney, Agent, or Firm*—Michael B. Johannesen

[57] ABSTRACT

An automatic call distribution system wherein, when no agent is immediately available, and the calculated delay before an agent is likely to become available is above a predetermined threshold, a record is made of the calling number (either received as part of call set up or inputs from the caller), and the record is queued. When an agent becomes available, or after a predetermined time, the ACD removes the top entry from the queue, places a call to the received calling number, and presents the call to an available agent.

5 Claims, 10 Drawing Sheets

FIG. 6
ORIGINATING EXCHANGE

CCS CASE
ANI AVAILABLE

FIG. 10

ISDN CASE
ANI NOT AVAILABLE

*FIG. 11*

NON ISDN CASE

AUTOMATIC CUSTOMER CALL BACK FOR AUTOMATIC CALL DISTRIBUTION SYSTEMS

TECHNICAL FIELD

This invention relates to automatic call distributors (ACDs) and, more specifically, to an arrangement for automatically calling back customers in lieu of placing the customers on hold.

BACKGROUND OF THE INVENTION

Automatic call distributors (ACDs) provide businesses with a system for routing incoming customer calls to an available operator or agent. There may be one ACD to handle a limited region for example, concert ticket sales, or there may be a plurality of ACDs connected together, but separated from each other, for handling a large-volume national business (for example, airline ticket sales). Such systems are known and used in the art and provide businesses with a greater incoming call handling capacity.

There are times, however, when even the large distributed ACD systems become flooded with calls so that incoming calls cannot be handled immediately. In these cases, an incoming call is normally placed "on hold" and queued for the next available agent. A customer may wait on hold for a few seconds to many minutes, listening to silence, music or advertisements until either an agent is available or the customer hangs up in frustration. During the waiting time, network resources are being used and either the customer or the business (in the case of "800" service) is paying for the use of the network resources. Furthermore, if the customer disconnects, the business looses income.

A recently offered service provides an announcement of the approximate waiting time in the queue before an agent becomes available. This service is described in U.S. Pat. No. 4,788,715 which issued to D. Lee on Nov. 29, 1988. The Lee Patent also states that the calling party may leave a number for later call back, but does not clearly specify a system for placing such a call back automatically.

Therefore, a problem in the art is that when ACDs have no available agents, new customer calls are placed on hold in a queue, which results in network resources being used at the expense of the business provider. A further problem in the art is that the customer spends idle time on hold and may disconnect, causing lost revenue to the business.

SUMMARY OF THE INVENTION

This problem is solved and a technical advance is achieved in accordance with the principles of the invention in an exemplary method and structural embodiment that completes calls from a caller to one of a plurality of agents to an automatic call distribution system wherein, when no agents are available, the telephone number of the caller is recorded and the call disconnected, and, when an agent becomes available at a subsequent time, a call is made from the ACD to the caller and the ACD connects the caller to the available agent.

A method in accordance with the invention completes a call from a caller to one of a plurality of agents served by an automatic call distribution system, wherein the telephone number of the caller is received by the automatic call distribution system during call set up and wherein the ACD determines whether any of the plurality of agents is available. Upon determining that no agent is available, the ACD queues the received telephone number of the caller and disconnects the call. When an agent becomes available, the ACD places a call to the caller using the queued telephone number and connects the caller to the available agent. Advantageously, the ACD, after determining that no agent is available, prompts the caller whether the caller desires to be queued for subsequent call back and the ACD queues the calling telephone number only if the caller agrees to be queued. Further, the ACD may calculate an approximate time before an agent will become available and inform the caller of the approximate delay.

A further embodiment provides a method for completing a call from a caller to one of a plurality of agents served by an automatic call distribution system (ACD) wherein a customer call is received at the ACD, and the ACD determines whether any of the plurality of agents is available. Upon determining that no agent is available, the customer is prompted for a telephone number. The customer provides the telephone number either through a series of DTMF signals which are decoded by a DTMF decoder, or verbally, which are decoded by a speech recognition system. The telephone number is then recorded and the call is disconnected. The telephone number of the caller is queued and, when an agent becomes available, a call is placed to the caller in the queue telephone number and the call is connected to the agent.

In a further embodiment, a method for completing a call from a calling party from an integrated services digital network (ISDN) telephone station set to one of a plurality of agents served by an ACD system is disclosed.

The method comprises connecting a call from an ISDN telephone to the ACD system wherein the ACD system will receive a telephone number. The ACD system then determines whether any of the plurality of agents is available and, upon determining that no agent is available, the ACD determines an expected delay time before an agent may become available. The ACD then sends a disconnect message to the ISDN telephone, via disconnect message and includes the delay time. Advantageously, the ISDN telephone displays the expected delay time and prompts the caller for acceptance of being queued. The ISDN telephone sends a confirmation message back to the ACD, including an indication of whether to queue the received telephone number for said call back or not. If the indication is positive, the telephone number is queued and the call is disconnected. When an agent becomes available, the ACD places a call to said caller using the received telephone number, and connects the caller to the available agent.

An apparatus embodiment is disclosed wherein, in a telephone network, wherein the telephone network comprises one or more local switching systems connected to the network, each of which is connected to a plurality of customer station sets, an automatic call distribution system is also connected to the network and to a plurality of agent stations. The ACD system comprises a processor for receiving telephone calls from a plurality of station sets, the processor determining whether an agent station is available. This embodiment also includes a queue for queuing the received telephone number when no agent is available, and the system for placing a call through the network using the received telephone number when an agent becomes available.

BRIEF DESCRIPTION OF THE DRAWING

A more complete understanding of the invention may be obtained from a consideration of the following description, in conjunction with the drawings in which.

DETAILED DESCRIPTION

Figure 1:
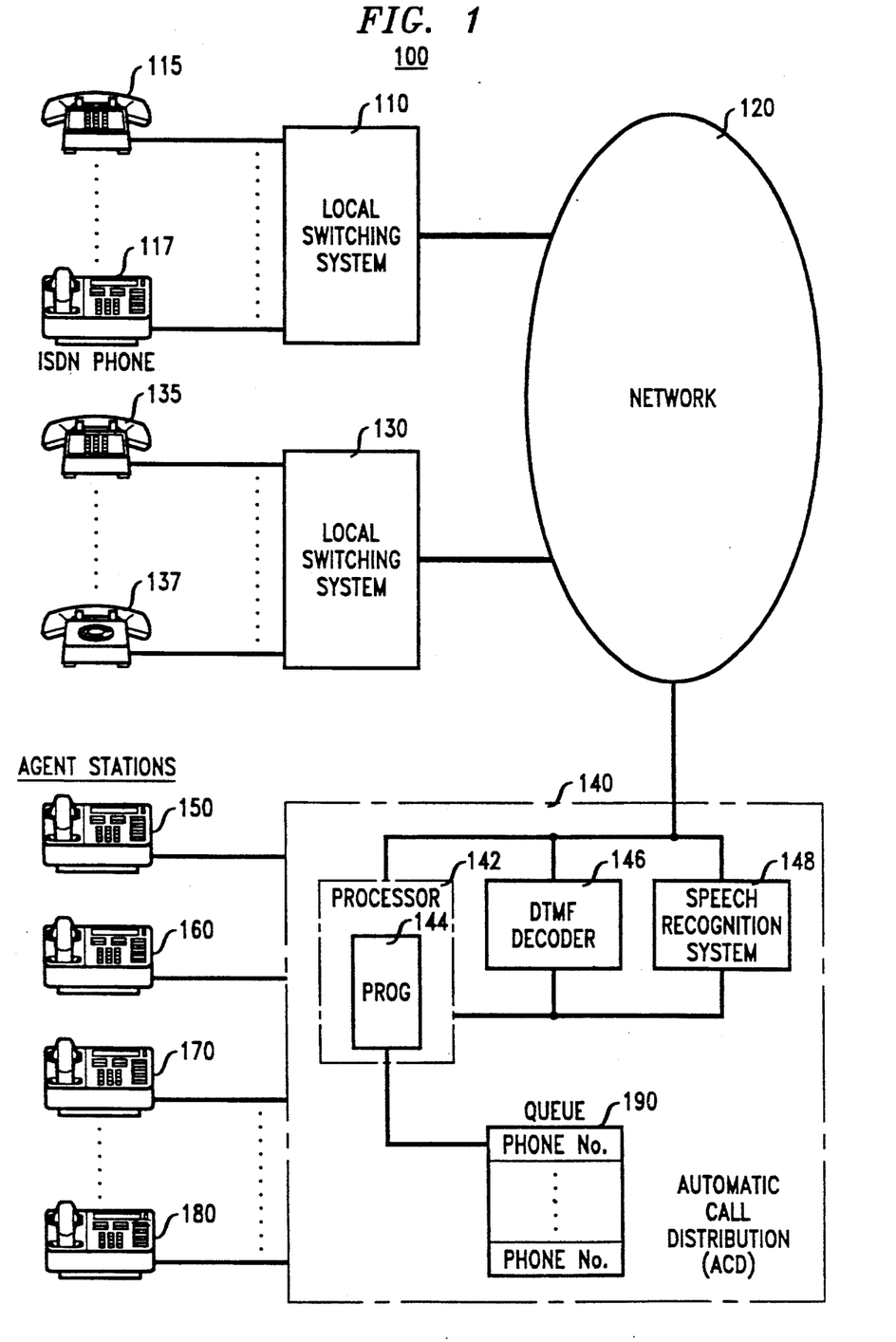
FIG. 1 is a block diagram illustrating the principles of this invention in the context of a telephone communication network.

FIG. 1 shows a simplified block diagram of a telecommunication system 100, wherein the exemplary method of this invention may be practiced. In this example, a first local telephone switching system 110 is connected to a plurality of telephone station sets, such as telephone station set 115 and ISDN station set 117. Local switching system 110 may be, for example, a distributed control, ISDN switching system such as the system disclosed in U.S. Pat. No. 4,592,048, issued to M. W. Beckner, et al., on May 27, 1986. Alternatively, switch 110 may be a distributed control, analog or digital switch, such as a 5ESS ® switch as described in the November, 1981, Bell Laboratories Record, page 258, and the December, 1981, Bell Laboratories Record, page 290, and manufactured by AT&T. Exchange 110 is connectable to analog touch-tone telephones such as telephone 115, and to ISDN telephones, such as 117. Exchange 110 is connected to telephone network 120, via trunks, as is well known in the art.

Telecommunications switching network 120 may comprise any combination of local and long distance switches, as known in the art. Also connected to telecommunications switching network 120 is local switching system 130. Local switching system 130 may also be an ISDN on 5ESS ® switch, as described above in connection with local switching system 110, or may be any other type of local switch, such as a 1AESS ™ switch or a crossbar switch. A plurality of telephone station sets such as touch-tone station set 135 and rotary dial telephone 137 are connected to local switching system 130, as is well known in the art.

Also connected to network 120 is automatic call distribution system (ACD) 140. ACD 140 serves a plurality of agent stations 150, 160, 170 and 180. ACDs are well known in the art and are described in U.S. Pat. No. 4,048,452 to Oehring, et al. ACD 140 includes processor 142 to control the functionality of ACD 140. Processor 142 operates under the control of program 144. Processor 142 also controls dual-tone, multifrequency (DTMF) decoder 146 and speech recognition system 148, as will be described below.

In the prior art, when a call is received by ACD 140, the call is connected to any available agent station 150–180. If all agent stations 150–180 are busy, then the call is placed on hold and the call is subsequently routed to the next available agent. In some systems, an average delay time is calculated, as described in D. Lee, U.S. Pat. No. 4,788,715, which is incorporated herein by reference. This delay may be communicated to the customer. The customer must then decide to hang up or wait. Since most ACDs are called using "In-WATS" or 800 numbers, the business using the ACD pays for a call connected to the ACD, whether the call is ultimately answered or not. Thus the business using the ACD must pay for the network resources for the entire time the call is in the queue and must pay for calls that disconnect while queued.

This problem is solved by the current invention in a first embodiment wherein, when the delay is above a certain threshold, the calling number is automatically recorded and the calling party is called back when an agent is available. For example, a calling party desires to book tickets to a concert and thus dials the telephone number of ACD 140 from ISDN telephone station set 117.

A call is established from telephone station set 117 through local switching system 110 and network 120 to ACD 140. If no agent is available, ACD 140 computes the average delay time. If the average delay time is above a certain threshold, a determination is made if the calling line ID (CLI) is available from the network. In an ISDN network, CLI is available. The calling party is prompted (via a message displayed at the ISDN terminal) for whether or not he or she accepts being put in a queue and called back when an agent is available. If the user of telephone station set 117 accepts, an entry is made in queue 190 containing the CLI, and the call is disconnected. When an agent station becomes available, a queue entry containing a phone number is removed from queue 190 on a first-in, first-out (FIFO) basis, a call is placed using that phone number and the agent station is connected to the call. Thus, network resources are economically utilized and ACD 140 is more cost effective to the business using ACD 140.

A call may also come from a non-ISDN telephone station set, such as touch-tone station set 115. In this example, CLI is delivered from local switching system 110 through network 120 to ACD 140, via ANI or similar network feature. Processing proceeds as above, except that the user of telephone station set 115 is prompted by a recorded or synthesized message to indicate whether he or she accepts being queued for call back. ACD 140 then places a DTMF decoder on the line, determines acceptance, and takes action as above.

In accordance with another exemplary embodiment of this invention, there are situations when a local switching system may not provide CLI to ACD 140. For example, if local switching system 130 is a crossbar system, CLI will not be provided to network 120. In these instances, after the call is established from touch-tone telephone 135 through local switching system 130 and network 122 ACD 140, ACD 140 prompts the user of telephone station 135 to enter his or her telephone number. ACD 140 then prompts the user of telephone station set 135 whether he or she wishes to be queued for automatic call back. ACD 140 then determines acceptance and takes action as above.

In a further exemplary embodiment, if local switching system 130 does not provide CLI to ACD and the calling party is calling from a dial pulse phone, for example, telephone station set 137, then ACD 140 prompts the user through a recorded or synthesized message to speak the numbers of the telephone number of telephone 137. ACD attaches a speech recognition system to the line and records the telephone number as it is spoken. ACD 140 then prompts the user of telephone station set 137 to verbally indicate acceptance. ACD 140 uses the speech recognition system to determine acceptance and takes action as above.

Figure 2:
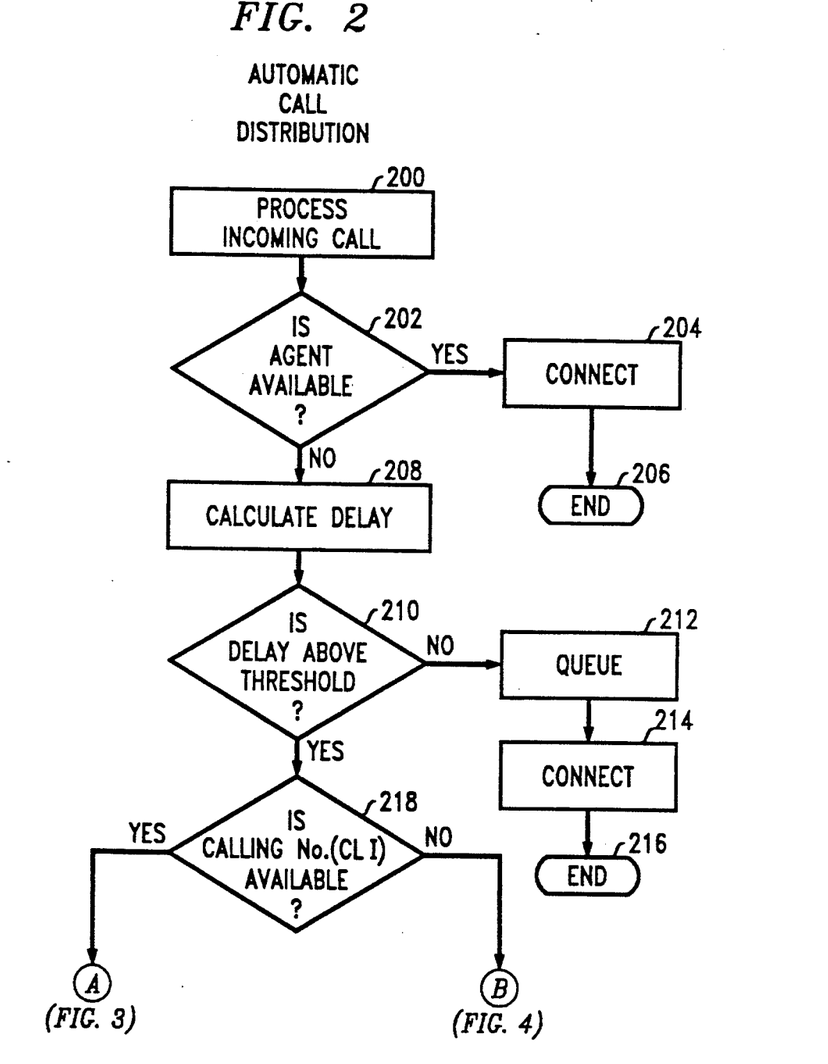
FIGS. 2 through 8 comprise flowcharts for an automatic customer call back for automatic call distributors describing the program control of the preferred embodiment of the invention for use in the telephone network of FIG. 1.

Turning now to FIG. 2, a flow chart describing the functionality of the method according to the preferred embodiment at the automatic call distribution system 140 (FIG. 1) is described. In box 200, ACD 140 processes an incoming call as is known in the art. As part of normal processing, in decision diamond 202, a decision is made whether an agent is available. If an agent is available, then processing proceeds to box 204 where the incoming call is connected to the available agent, and processing ends in box 206.

If, in decision diamond 202, an agent is not available, then processing continues to box 208. In box 208, the average delay time (delay) is calculated. The delay is calculated based on the number of agents, the average number of phone calls, and the average waiting time. After calculating the delay time in box 208, then in decision diamond 210, the delay is compared to a predetermined threshold value. The threshold value is the average delay time beyond which the customer probably would not wait on a queue. This time may be empirically determined and adjusted for the individual application. If, in decision diamond 210, the delay is not above the threshold, then in box 212 the call is queued. After being in the queue for a certain amount of time, the call will be connected to an available agent in box 214 and processing ends in box 216.

If the delay is above the predetermined threshold in decision diamond 210, then a determination is made in decision diamond 218 if the calling line ID (CLI) is available. If CLI is available in decision diamond 218, processing proceeds to connector A, FIG. 3. If CLI is not available in decision diamond 218, then processing proceeds to connector B, FIG. 4.

Figure 3:
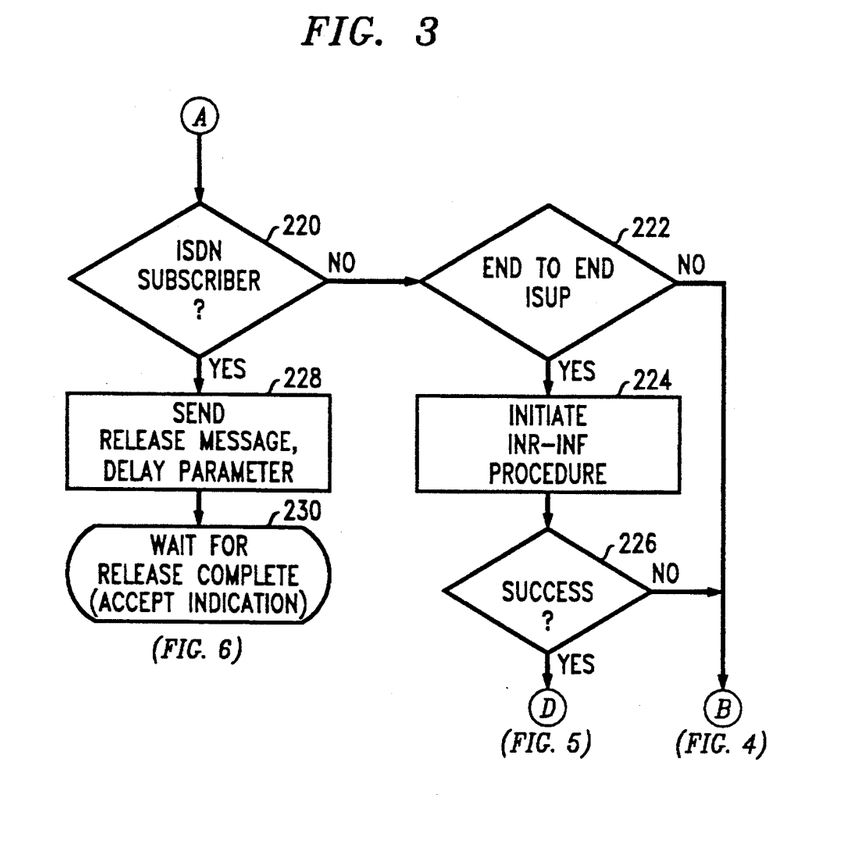

Turning now to FIG. 3, a continuation of the flow chart describing the functionality of the exemplary method is shown. Continuing from connector A, a determination is made in decision diamond 220 whether the calling party is calling from an ISDN telephone station set. As reflected in the CCS message delivered to ACD 140. If the calling telephone is an ISDN telephone station set, then processing proceeds to box 228 where a release message (as known in the art) is sent through the network to the local switching system and delivered to the ISDN telephone station set, including the delay time as a parameter. Processing proceeds to oval 230 where the ACD waits for the release complete message which includes an acceptance indication (AI) reflecting whether the customer accepts being queued for call back. The call remains in the wait state of oval 230 until one of the events described in FIG. 7.

Figure 4:
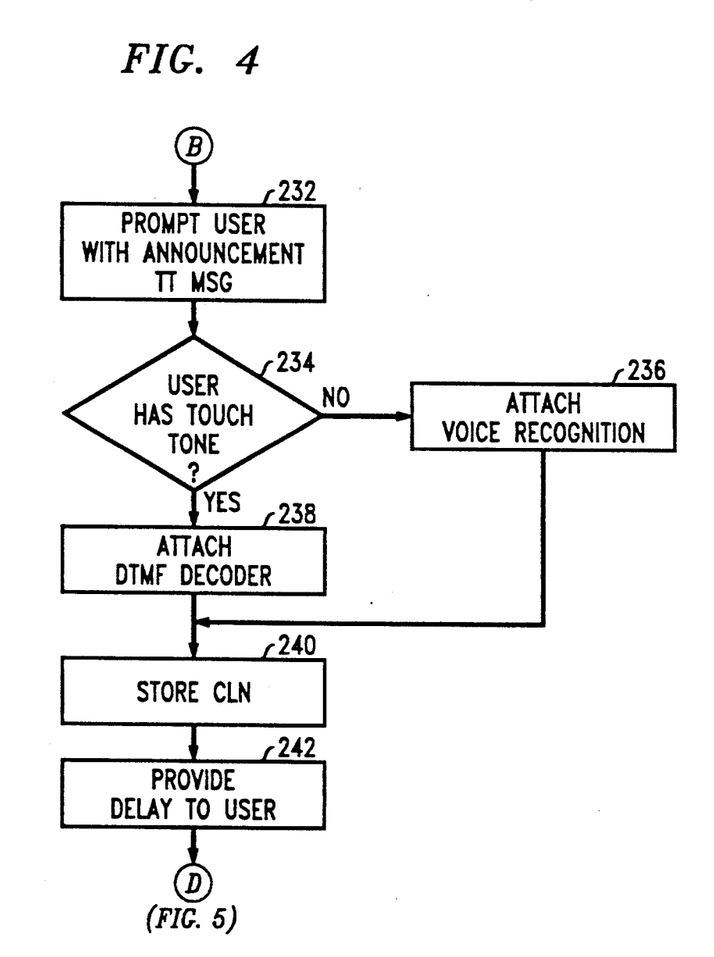

If in decision diamond 220 the calling party is not using an ISDN telephone station set, a determination is made in decision diamond 222 whether the network connection has end-to-end ISUP. If the network connection is not end-to-end ISUP then processing continues to connector B (FIG. 4). If there is end-to-end ISUP, then in box 224 an information request-information (INR-INF) procedure, as is known in the art, is initiated. In this procedure, the local switching system for the calling party is queried for the phone number of the calling party. Processing then continues to decision diamond 226 to determine whether the ACD now has the telephone number of the calling party. If the ACD does not have the telephone number of the calling party, then processing continues to connector B, FIG. 4. If the ACD does have the telephone number of the calling party then processing continues to connector D, FIG. 5.

Turning now to FIG. 4, control of the ACD is shown when the calling line number is not delivered to the ACD by the network. In box 232, the user is prompted with an announcement to determine whether the user has a touch-tone telephone. In decision diamond 234, a determination is made if the user has a touch-tone telephone. If the user does not have a touch-tone telephone, control passes to box 236 where a voice recognition system is attached to the incoming line. If the user does have the touch-tone telephone, then a dual tone, multi-frequency (DTMF) decoder is attached to the line in box 238. Control passes to box 240, where the user is prompted for his or her phone number and the calling line number is received either as a string of DTMF signals or, alternatively as spoken numbers, as is known in the art. Translation takes place in either the DTMF decoder or the voice recognition system, and the calling line number is stored in a queue. Control then passes to box 242 where the delay is provided to the user by way of a synthesized speech announcement. Control then passes through connector D, FIG. 5.

Figure 5:
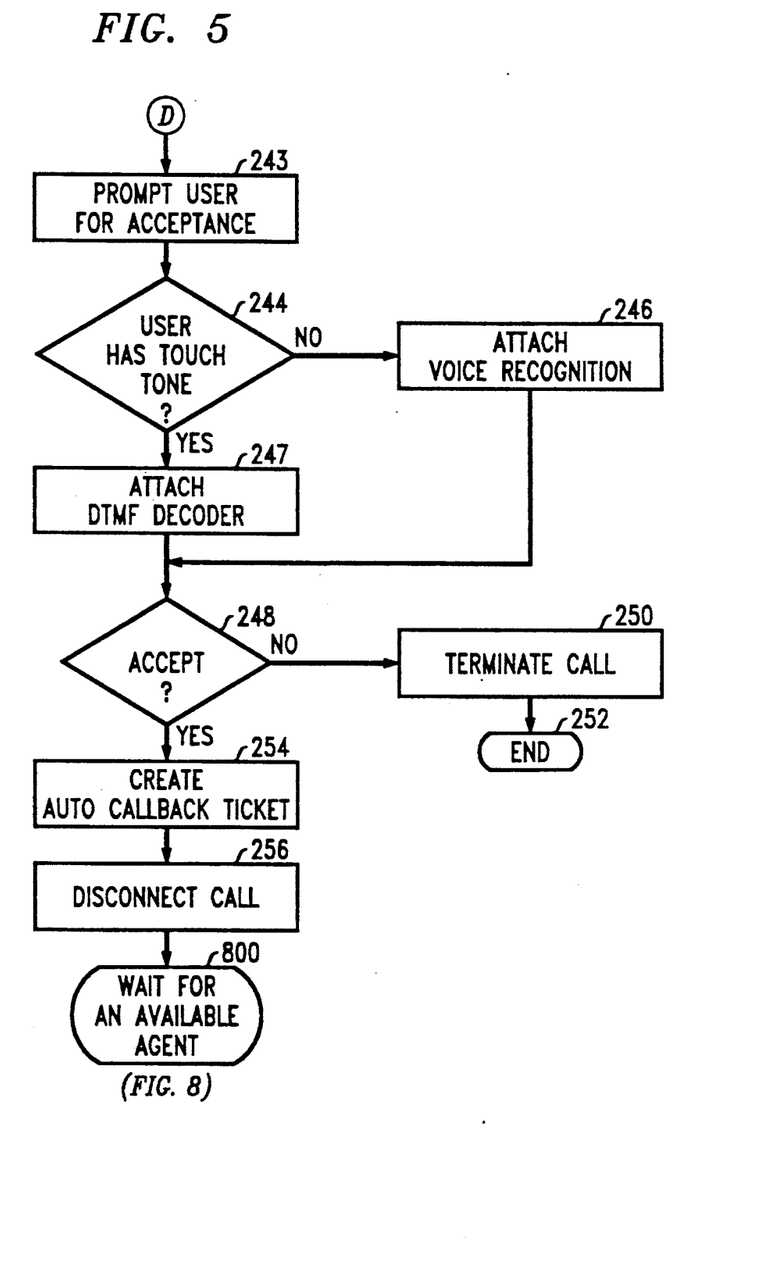

Turning now to FIG. 5, control of ACD 140 is shown for acceptance of auto call back and connection of the call. In box 243, the user is prompted for acceptance. A synthesized speech prompt asks the user to key in the number or alternatively speak a confirmation that the user wishes to be called back. In decision diamond 244 a determination is again made if the user has a touch-tone telephone. If the user does not have a touch-tone telephone, then control passes to 246, and a voice recognition system is attached to the line. If the user has a touch-tone telephone, a DTMF decoder is attached to the line in box 247. Control passes to decision diamond 248 where a determination is made if the user accepts being queued for call back. If the user does not accept being queued for call back, control passes to box 250, where the call is terminated, as is known in the art, and the call ends in box 252.

If the user accepts being queued, then control passes to box 254 where an auto call back ticket is created and placed in queue 190. In box 256 the call is disconnected. In oval 800, the ticket is in the state of waiting in the queue. This state continues until one of two events occurs, as will be described below in connection with FIG. 8.

Figure 6:
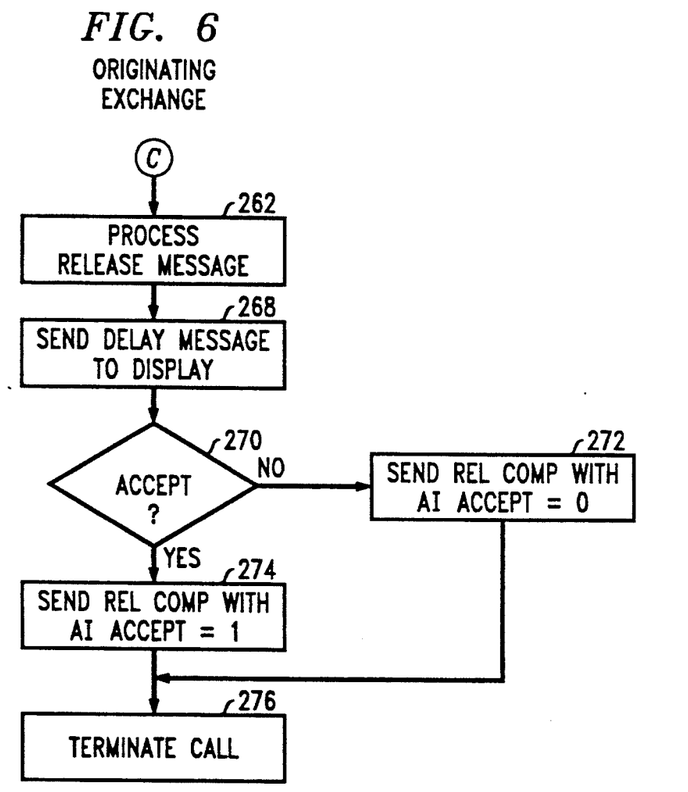

Turning now to FIG. 6, control at the originating local switching system is shown in connection with an ISDN telephone station set. Control passes to box 262 where the release message is processed at the local switching system. The delay time is passed to the local switching system from the ACD as a parameter to the release message. In box 268, a delay time message is sent to the display of the ISDN telephone station set along with a prompt for acceptance of being queued for call back. The user of the ISDN set presses a preselected button on the ISDN telephone station set, or dials a prespecified digit, indicating acceptance or not. If the user indicates non-acceptance, as determined in decision diamond 270, the control passes to box 272 where the release complete message is formatted and the acceptance indicator (AI) is set to zero, indicating non-acceptance. If in decision diamond 270 the user indicated acceptance, then in box 274 the release complete message is sent back to the ACD node for the local switching system with the acceptance AI indicator set to one. The call is then terminated in a normal fashion at the originating node in box 276, and ends at box 278.

Figure 7:
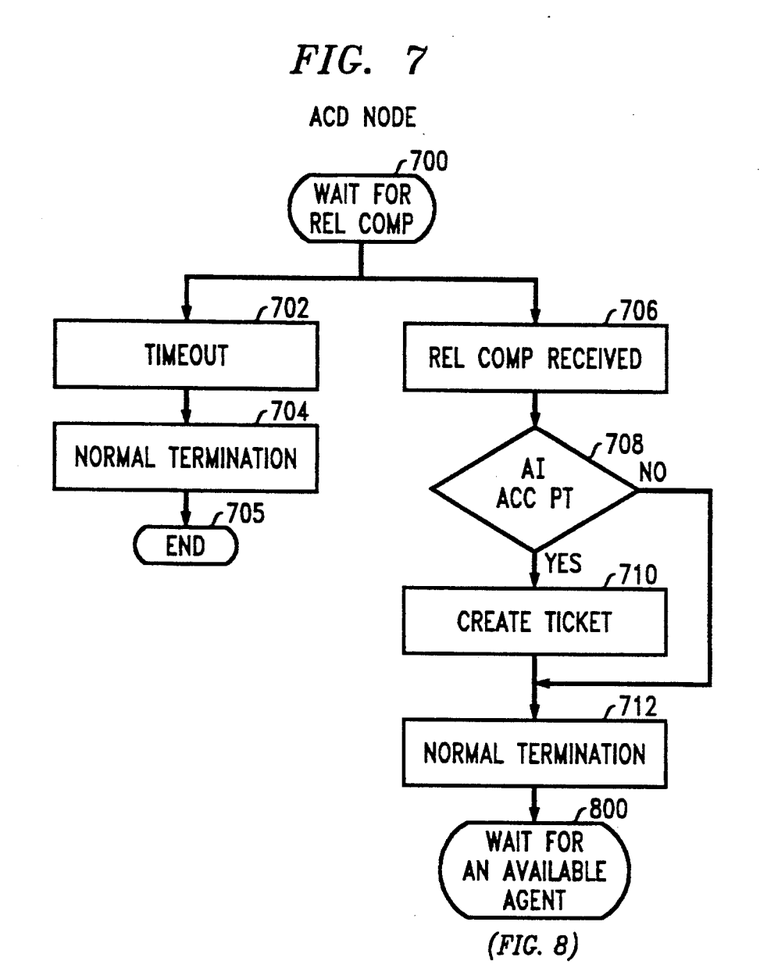

FIG. 7 shows the flow of control at the ACD node upon receipt or time out of the release complete message. In oval 700 the ACD node is in a state waiting for the release complete message. There are two possible events which change state. In box 702, the ACD node timed out waiting for the release complete message. In the case of a time out, the call is terminated without creating a queue ticket for automatic call back in box 704, and the call ends in box 705.

Figure 8:
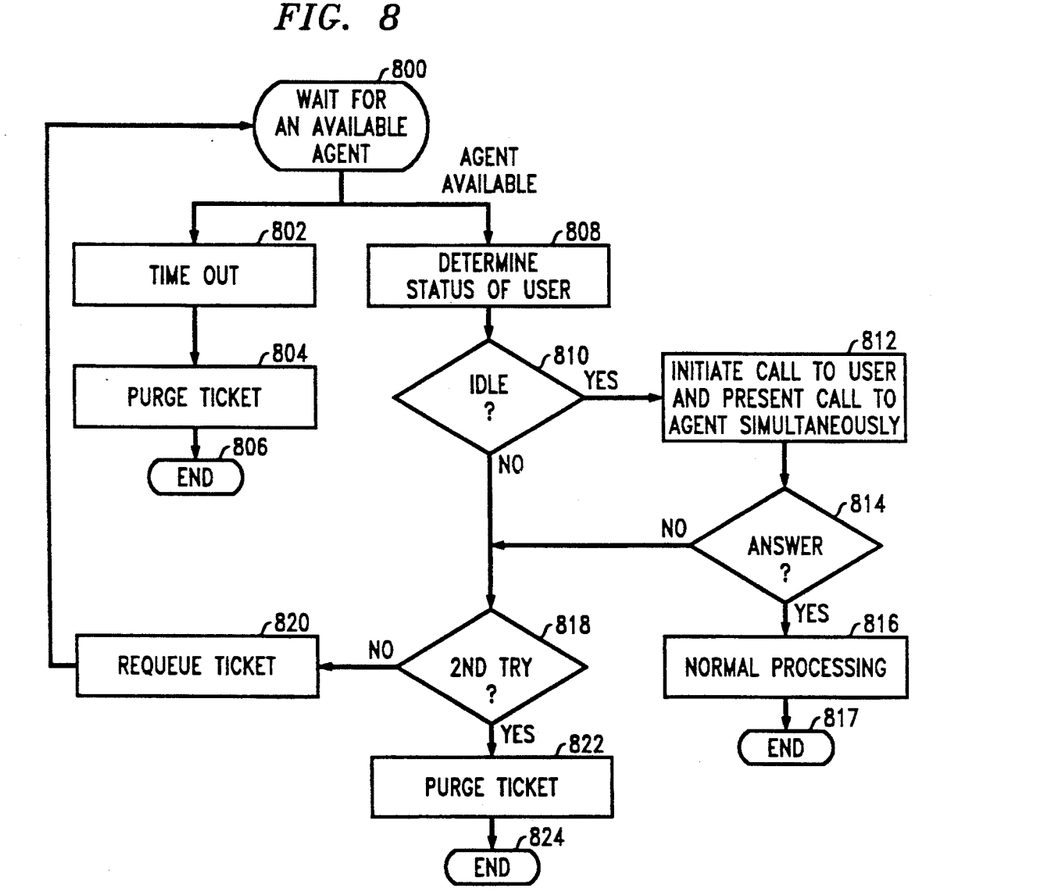

Receipt of the release complete message causes a transfer from the wait state 700. In box 706, a release complete message is received, and processing continues to decision diamond 708 where the AI field in the release complete message is checked for acceptance. If the AI field indicates acceptance, then a ticket is created in box 710 and the call is placed in a queue for an available agent. Control continues to box 712 where normal call termination processing is performed, as is known in the art. Control then passes to oval 800 where the call transitions into the state of waiting for an available agent.

Turning now to FIG. 8, processing continues from the wait for an available agent state 800. There are two transitions from the state of waiting for an available agent. First is a time out, as in box 802. If a call in the queue has been in the queue for longer than a predetermined time, then the queue entry is cleared in box 804 and that call ends in box 806.

When an agent becomes available, processing continues to decision diamond 810, where the status of the user line is determined, as is known in the art. If a user line is idle, control passes to box 812 where a call is placed to the number previously queued and the call is presented to the agents simultaneously. In decision diamond 814, a determination is made if the call is answered by waiting for answer supervision to return from the far end local switching system. If answer supervision is received, processing continues to box 816 where the call is connected normally and ultimately the call is ended at box 817.

Alternatively, ACD 140 may not wait until an agent becomes available before calling back the caller. In this manner, further agent time savings may be realized, by not forcing an agent to be available while the caller is being alerted (rung). The caller is called back at a subsequent time when the ACD may be less heavily loaded. According to one implementation, the delay time calculated previously is used to approximate the delay time before the caller is called back, optionally subject to a minimum delay interval. Once the appropriate interval of time has lapsed for a particular entry in the queue, a call is placed to the calling party. If the calling party answers (i.e., answer supervision is received from the line), a determination is made if an agent is available. If an agent is available, the call is immediately connected to the available agent. If an agent is not available, the call may be queued briefly, an announcement may advantageously be played to the calling party stating that an agent will be available shortly, and then the call connected to the next available agent. A system similar to this for use in the operator services area is fully disclosed in U.S. Pat. No. 4,899,375, which issued to T. M. Bauer, et al. on Feb. 6, 1990 and assigned to the assignee of the present invention. This patent is incorporated herein by reference.

Returning now to FIG. 8, if in decision diamond 814 the call is not answered or alternatively if in decision diamond 810 the line was determined not to be idle, control passes to decision diamond 818 where a determination is made if this were the second attempt to connect to this particular telephone number. If it were not the second attempt, then control passes to box 820 where the ticket is requeued and control passes to the waiting for an available agent state 800. If in decision diamond 818 a determination is made that it was the second try, then control passes to box 822 where the ticket is cleared from the queue and in box 824 the call is ended.

Figure 9:
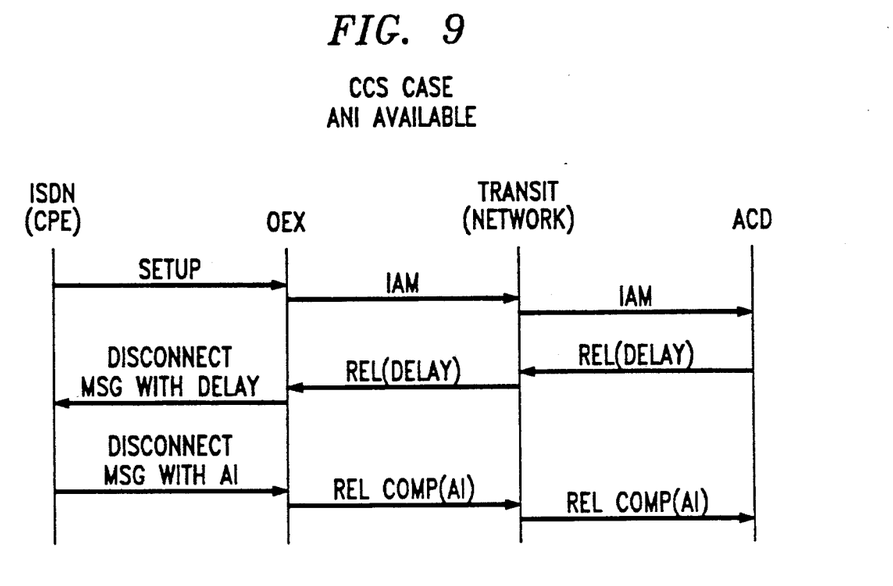
FIGS. 9 through 11 are diagrams of the message sequences according to the exemplary method of this invention for use in the telephone network of FIG. 1.

Turning now to FIG. 9, the message flow for an end-to-end digital network is shown. First the ISDN customer premise equipment (CPE) sends a setup message to the originating local switching system (OEX). The originating local switching system sends an IM message through the transit network and the transit network forwards the IAM message to the ACD node. The ACD node, after determining that no agents are available and after calculating the delay time, sends a release message with the delay time as a parameter through the transit network, which forwards the release message and the delay time to the originating local switching system. The originating local switching system sends a disconnect message to the ISDN customer premise equipment with the delay time in the message. The ISDN customer premise equipment sends a disconnect message back to the originating local switching system with an acceptance indicator (either yes or no). The originating local switching system sends a release complete message back through the transit network with the acceptance indicator as a parameter, which forwards the release complete message to the ACD node.

Figure 10:
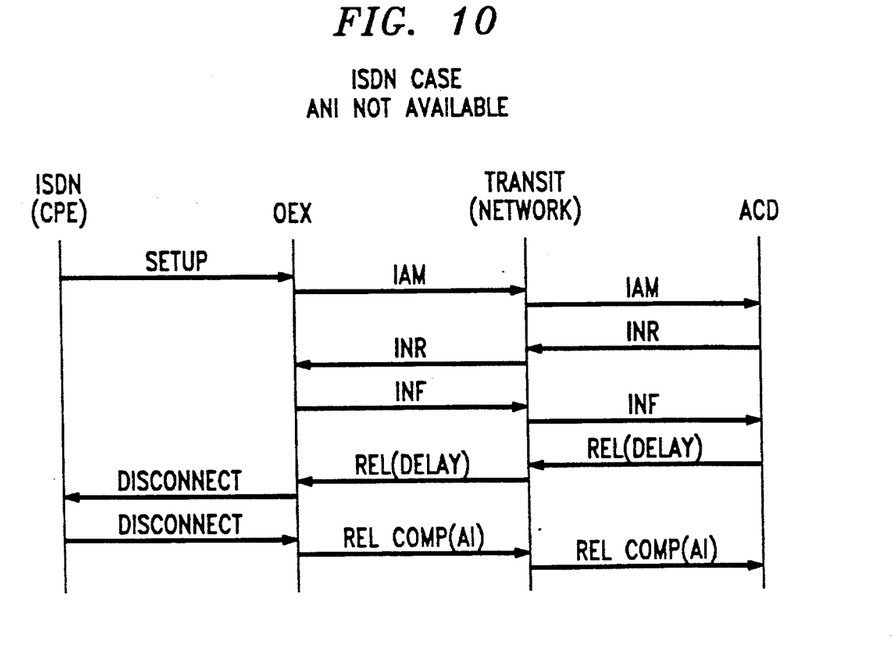

FIG. 10 shows an ISDN case when CLI has not been delivered to the destination ACD exchange. The ISDN customer premise equipment sends a setup message to the originating local switching system which then forwards an IAM message through the transit network to the ACD node. The ACD node then sends an information request (INR) message back through the transit network which then forwards the information request message to the originating local switching system. The originating local switching system formats and sends an information message (INF) including the telephone number of the ISDN customer through the transit network to the ACD node. The ACD node then sends a release message with the delay time through the transit network to the originating local switching system. The originating local switching system sends the disconnect message with the delay time to the ISDN customer premise equipment. The ISDN customer premise equipment then sends a disconnect confirmation message with the acceptance indicator (AI) to the originating local switching system. The originating local switching system then formats and sends a release complete message with the acceptance indicator (AI) as a parameter through the transit network to the ACD node.

Figure 11:
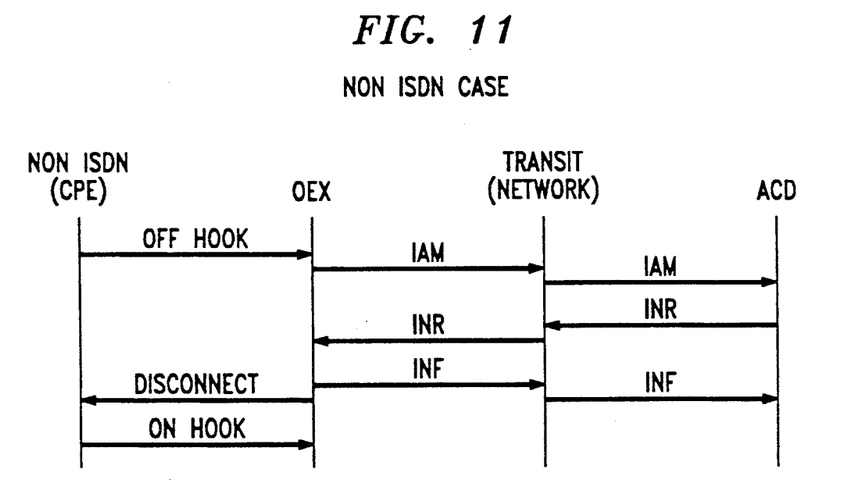

Turning now to FIG. 11, a message scenario is shown when the customer premise equipment is not ISDN and ANI is not delivered through the network. In this case, the customer goes off-hook which appears at the originating local switching system and the originating local switching system sets up a call through the transfer network to the ACD node. The originating local switching system sends an IM message through the transit network to the ACD. The ACD node, upon receipt of the call setup, sends an information request (INR) back through the transit network to the originating local switching system. The originating local switching system sends an information message (INF), including the telephone number of the non-ISDN customer premise equipment, back through the transit network to the ACD node. The originating local switching system simultaneously sends a disconnect to the non-ISDN phone and the user goes on-hook, which appears at the originating local switching system.

It is to be understood that the above-described embodiments are merely illustrative principles of the invention and that many variations may be devised by those skilled in the art without departing from the scope of the invention. It is therefore intended that such variations be included within the scope of the claims.

I claim:

1. A method for completing a call from a calling party at an integrated services digital network (ISDN) telephone station set to one of a plurality of agents at an automatic call distribution (ACD) system through a digital network, said ISDN telephone station set being connected to a terminating switch in said digital network, said ISDN telephone having a telephone number, said method comprising:

sending a call set up message from said ISDN telephone through said digital network to said ACD system;

receiving said telephone number in said ACD system;

determining whether any of said plurality of agents is available;

upon determining that no agent is available, determining an expected delay time before an agent may become available;

sending a disconnect message to said ISDN telephone including said delay time;

said calling party sending a confirmation message through said ISDN telephone back to said automatic call distribution system, including an indication of whether to queue said received telephone number for subsequent callback;

if said indication is positive, queuing said received telephone number of said ISDN telephone; and when an agent becomes available, said automatic call distribution system determining whether said ISDN telephone is idle by sending a message to said terminating switch, and, responsive to determining that said ISDN telephone is idle, placing a call to said caller using said received telephone number and connecting said caller to said available agent.

2. A method according to claim 1 wherein said ISDN telephone is connected to a local switching system and said step of receiving said telephone number comprises said automatic call distribution system requesting said number from said local switching system and said local switching system delivering said number.

3. A method according to claim 1 wherein said disconnect message is sent if said determined delay time exceeds a predetermined threshold.

4. A method for completing a call from a caller to one of a plurality of agents at an automatic call distribution (ACD) system through a telephone network, said method comprising:

receiving said call at said automatic call distribution system;

receiving the telephone number of the caller by said automatic call distribution system;

determining whether any of said plurality of agents is available;

upon determining that no agent is available, and that an expected delay for an available agent exceeds a predetermined threshold, queuing said received telephone number of said caller and disconnecting said call;

at a subsequent time, said automatic call distribution system placing a call to said caller using said received telephone number and in response to receiving an answer, connecting said caller to a next available agent; and if an agent is not available after said call placed by said automatic distribution system is answered by said caller, queuing said call in a high priority queue for an available agent.

5. A method in accordance with claim 4 further comprising:

after queuing said call in said high priority queue, providing a message that said call is queued.

* * * * *